United States Patent
Berko et al.

(10) Patent No.: US 12,170,678 B2
(45) Date of Patent: *Dec. 17, 2024

(54) AUTOMATIC INCIDENT GENERATOR

(71) Applicant: Acronis International GmbH, Schaffhausen (CH)

(72) Inventors: Nickolay Berko, Schaffhausen (CH); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 214 days.

This patent is subject to a terminal disclaimer.

(21) Appl. No.: 17/804,830

(22) Filed: May 31, 2022

(65) Prior Publication Data
US 2023/0388321 A1    Nov. 30, 2023

(51) Int. Cl.
*H04L 9/40* (2022.01)

(52) U.S. Cl.
CPC ...... *H04L 63/1416* (2013.01); *H04L 63/1433* (2013.01)

(58) Field of Classification Search
CPC ........................ H04L 63/1416; H04L 63/1433
See application file for complete search history.

(56) References Cited

U.S. PATENT DOCUMENTS

| | | |
|---|---|---|
| 6,751,752 B1 | 6/2004 | Smith |
| 9,432,430 B1 | 8/2016 | Klenz |
| 9,888,031 B2 | 2/2018 | Barak et al. |
| 11,050,773 B2 | 6/2021 | Will et al. |
| 11,182,798 B2 | 11/2021 | Zirnhelt |

(Continued)

FOREIGN PATENT DOCUMENTS

| | | |
|---|---|---|
| CN | 110140116 A | 8/2019 |
| EP | 3180732 B1 | 7/2020 |
| JP | 6280862 B2 | 2/2018 |

OTHER PUBLICATIONS

Signature based trouble ticket classification Jian Xu et al. ("Signature based trouble ticket classification", Future Generation Computer Systems, vol. 78, Part 1, Jan. 2018, pp. 41-58, (Year: 2018).*

(Continued)

*Primary Examiner* — Bruce S Ashley
(74) *Attorney, Agent, or Firm* — ESPE Legal Consultancy FZ-LLC (57) ABSTRACT

A system for automatic recognition of security incidents includes a processor coupled to a memory storing instructions, the processor being configured to implement the instructions for an automatic incident generator (AIG) with at least one type of events related to the system, and access to a repository of information about previously recorded incidents with the events related to these previously recorded incidents, to monitor a plurality of events, identify sequences of events including suspected signatures that are capable of constituting an incident, calculate a degree of variance (DoV) of the suspected signatures and at least one signature related to a previously recorded incident, compare the DoV to at least one threshold and, if the DoV is less (or less or equal) to the threshold, identify the incident and optionally initiate the workflow related to the identified incident.

20 Claims, 4 Drawing Sheets

(56) References Cited

U.S. PATENT DOCUMENTS

| | | | |
|---|---|---|---|
| 2007/0112713 A1 | 5/2007 | Seaman et al. | |
| 2011/0016316 A1* | 1/2011 | Amir | H04L 63/12 |
| | | | 713/168 |
| 2016/0196174 A1* | 7/2016 | Jacob | G06F 11/079 |
| | | | 714/37 |
| 2021/0192057 A1 | 6/2021 | Helfman et al. | |
| 2022/0263731 A1* | 8/2022 | Gupta | G06F 40/289 |
| 2023/0069731 A1* | 3/2023 | Chen | H04L 63/0263 |
| 2023/0078713 A1* | 3/2023 | Neuvirth | H04L 63/1416 |
| | | | 726/23 |

OTHER PUBLICATIONS

Acronis. Acronis security incident analysis, Mar. 13, 2023, https://www.acronis.com/en-sg/blog/posts/acronis-security-incident-analysis/, Acronis security incident analysis.pdf.

\* cited by examiner

AUTOMATIC INCIDENT GENERATOR

TECHNICAL FIELD

The present invention pertains to computer systems and protection of data on these computer systems from loss from actions caused by people or events, such as threat agents and threat events.

BACKGROUND

Computer systems rely in their functionality on different types of data that include but are not limited to operating system (OS), applications, application settings, files (contents and metadata), data in transit (e.g., part of network traffic), data in computer memory (e.g., application variables and clipboard), and databases or other data storages.

Information security (INFOSEC) systems are designed for keeping information confidential, available, and assuring its integrity.

A specific subclass of INFOSEC systems are Data Loss Prevention (DLP) systems that enforce information (1) storage and (2) transfer rules.

First, DLP systems enforce the storage rules demanding that certain types of information are stored only in approved locations and may take steps in case if such system detects certain information in an unauthorized location.

Second, DLP systems make sure that information may only be transmitted by a sender who has permission to send such information to a receiver who has permission to receive such information from the sender.

DLP systems deploy numerous controls including preventive that prevent data dissemination to unauthorized users, detective (e.g., controls designed to detect and investigate attacks, data leakage incidents, errors or irregularities), and corrective (e.g., controls designed to mitigate attacks, data leakage incidents, correct errors or irregularities). Currently, DLP systems use pre-defined by a vendor or manually configured sets of rules that govern their controls.

Computer systems may include individual devices (nodes) that use networks and peripheral devices to communicate between themselves. Some of these devices are computers, network routers, intrusion detection systems, network attached storage (NAS) devices, USB Flash Drives, to name just a few.

Computer systems utilize a notion of "users" to denote individual people and applications (e.g., service accounts) to describe permissions and track actions within these systems.

DLPs analyze computer systems and network traffic to detect potential malicious actions by threat agents or threat events. These systems may determine that a combination of certain events indicate a potential malicious or accidental (non-intentional) action that may lead to data leakage (an "incident").

Once a DLP identifies an "incident," a pre-defined manually configured action is taken.

The configuration of a DLP system (1) is prone to errors due to human involvement, (2) involves manual work and hence carries additional cost, and (3) due to the necessity of manual interaction, may be slow to react to changing threat environments.

On the other hand, many incidents display certain similarities as many of them reflect certain sets patterns of user actions (and corresponding events) that have resulted in the past in a security incident.

Some of these security incidents were classified as, e.g., a data exfiltration, i.e., unauthorized transfer of data from a computer or other device.

Unauthorized data transfer may happen via communication channels such as email, instant messaging, SMS, social media, etc.

Alternatively, unauthorized data transfer may occur via copying to a peripheral device or via printing.

One of the real-life examples is related to an attacker who is (1) an insider, (2) is dedicated, and (3) relatively technically savvy.

In the example, such an attacker is attempting to send a file known to contain protected information via email to an unauthorized recipient.

Each time such an attempt is made, the system scans the file and prohibits the transaction.

The attacker then encrypts this file and successfully sends it.

From the analytical point of view, this process has a pattern: several failed attempts to send one file followed by a successful sending of another file that is (1) encrypted and (2) of a similar size.

So far, the pattern is obvious and may be manually added as a rule to an analytical engine that governs the behavior of the system.

But even with an obvious pattern and manual addition (in the form of a script or by changing the source code and providing the functionality in the next release), some time will pass between the moment when the first such incident is investigated and the moment when the system is capable of automatically detecting future such incidents.

SUMMARY

The invention solves this problem by adding a mechanism of comparing the on-going flow of events to the database of known incident signatures.

This example demonstrates how previously investigated incidents that resulted in successful attacks may assist the system in preventing future attacks by identifying initial events of the incident. In the case of this example, when the system detects several failed attempts to send a file, a different, "preventive" incident may be raised that will result in this information to be communicated to a security office who may have a chat with the sender. In many cases, the fact that the intent of the potential perpetrator is known to the authorities is the sufficient deterrent to continuation of potentially harmful activity.

Also, more complicated approaches may be used to detect classes of attacks that are notoriously hard to detect: collisions. In case of a collision, there are at least two actors performing different actions for a common goal. In many cases, none of the two (or more) players involved in a collision attack has sufficient authority to perform the action individually or cannot perform the action individually without being detected.

Current methodology with proper implementation allows to formulate system requirements that will detect collision attacks.

In the case of the first example, the system may detect multiple people trying to send the same file unsuccessfully followed by yet another person successfully sending an encrypted file of comparable size.

This approach may also be applied to anti-fraud analytics.

The textbook example is accounts payable paying for invoices with exactly the same amount for a category of goods or services that normally result in invoices with different values.

Once such an incident has been detected, the system can start scanning accounts payable activity to detect events of such payments.

A slightly more complicated, but also a textbook example involves monitoring of two systems: accounts payable and HR (specifically, the system that monitors vacations). If certain payments have been performed on a regular basis when an employee was working, but not performed when the job was performed by somebody else, then there is an indication that a potentially fraudulent activity has occurred.

Currently, a number of different fraud detection and fraud prevention systems have already been implemented. Many of them are scripting engines allowing for addition of scripts for newly discovered fraud patterns. Yet these systems suffer from the same shortcomings: it takes time between identification of key events that form the signature of the discovered fraud incident and the time when the system can start looking for similar events.

The invention allows the system to immediately include the event signature of the newly investigated incident to the plurality of known signatures against which the event flow is compared.

The invention also introduces the notion of Degree of Variance between vectors of events. The Degree of Variance allows for a wide range of different implementations. Even more, several different Degree of Variance functions may be implemented within the same system. For example, one of them may take into account the fact that all events are related to a particular user while the other one may ignore such fact. To sum up, the present invention addresses the problem of conventional systems and methods by introducing an automatic incident generation system and method.

In the present invention, a system and a method are disclosed that allow for automatic configuration for detection of incidents by comparing sets of events (potential incident signatures) to previously identified incidents and related events (incident signatures).

The present invention addresses the problem of manual configuration of conventional incident detection systems.

Currently, some systems can be configured, manually or hardcoded, to detect a certain collection of events that may constitute a potential security incident. For example, a login event by a user from an unusual IP address and unusual activity by that user (e.g., access to files on LAN) may indicate an incident of unauthorized access.

The present invention compares data about a plurality of events related to a given computer system to the collection of previously investigated incidents with related events.

Automatic Incident Generator (AIG) monitors the plurality of events (PoE) for relationships similar to the relationships between recently and previously identified incidents (PII).

That system may be deployed in addition to or separately from the system with pre-defined (hardcoded) or manually configured event criteria.

Each PII has a collection of events associated with it. Such collection is used to generate an Incident Signature (IS) that includes certain information related to the events associated with it. The contents of the signature may depend on the timing of the events when information about earlier event(s) is placed in the signature ahead of the information about later events.

AIG monitors PoE for sequences of events similar to ISs of PIIs.

A degree of variance (DoV) function is defined that produces a numeric value indicating how different two signatures are. That DoV function may be such that for every incident A, DoV(A,A)=0. That DoV function may further be such that for every incident A, B, and C, the following is true: DoV(A,B)+DoV(B,C)>=DoV(A,C).

DoV may be defined not only on signatures that have similar structure (e.g., same sequence of events), but also on signatures with different structure when some of the events have not been observed yet in the PoE.

Once a "suspect signature" (SS)—a sequence of events at least partially matching at least one IS of a PII, the DoV is calculated between that SS and the IS of that PII.

A threshold is defined such that, if the DoV of the SS and the IS of a PII is less (or less or equal) to that threshold, then a new incident is generated with the SS signature.

After a new incident is identified, a related action may be taken (e.g., access blocked, or administrator notified).

The approach by the present invention allows to predict potential future security incidents when the DoV between identified SSs and IS of at least one of the PIIs is still above the threshold but is getting smaller approaching the threshold.

An example of a an incident that includes a sequence of events that may indicate a potential malicious data leakage includes (1) several events each of them—an attempt by a sender to transmit certain protected data to a receiver (or to copy to a peripheral device) that failed due to some security restrictions enforced by a DLP followed by (2) a successful transmission of a comparable amount of data to the same or another receiver (or to the same or a different peripheral device) within a relatively short amount of time. In that scenario, the sender may have encrypted or otherwise transformed the protected data to conceal its nature from DLP. E.g., DLP would not be able in step (2) to analyze the contents or metadata related to the information unit (e.g., a file or a message).

DETAILED DESCRIPTION

Automatic Incident Generator (AIG) is a system that automatically identifies an incident based on (1) plurality of events, (2) information about events related to previously identified incidents (identified incident signatures—ISS), and (3) potentially some other data.

The system and method of the present invention identify sequences of events—suspect signatures (SS) that appear to be similar to some of the previously identified incident signatures (IIS).

Proposed system calculates the degree of variance (DoV) between a given SS and IIS. If that DoV is below a certain predefined threshold, then the system generates a new incident.

Once an incident is identified, AIG may take an action or generate a message with information about the incident or take another action.

In an embodiment, AIG determines recommended controls including corrective (e.g., blocking an application, access restriction, user account deactivation, port blocking, type of traffic blocking, raising alarms, generating incident report, communicating incident report to relevant users, etc.) and/or detective actions (e.g., capturing screenshots, saving recent events, capturing contents of computer memory and/or network traffic, etc.) based on data related to the incident with IIS that has DoV smaller than the threshold with the SS.

Other types of INFOSEC systems may also apply other controls such as initiating failover to another resource to restore or to enhance availability.

In an embodiment such analysis is performed by applying pre-programmed heuristic rules, statistical analysis, a neural network, or support vector machines, for example, based on the information of known past incidents.

In an embodiment such analysis is followed by execution of identified controls.

Figure 1:
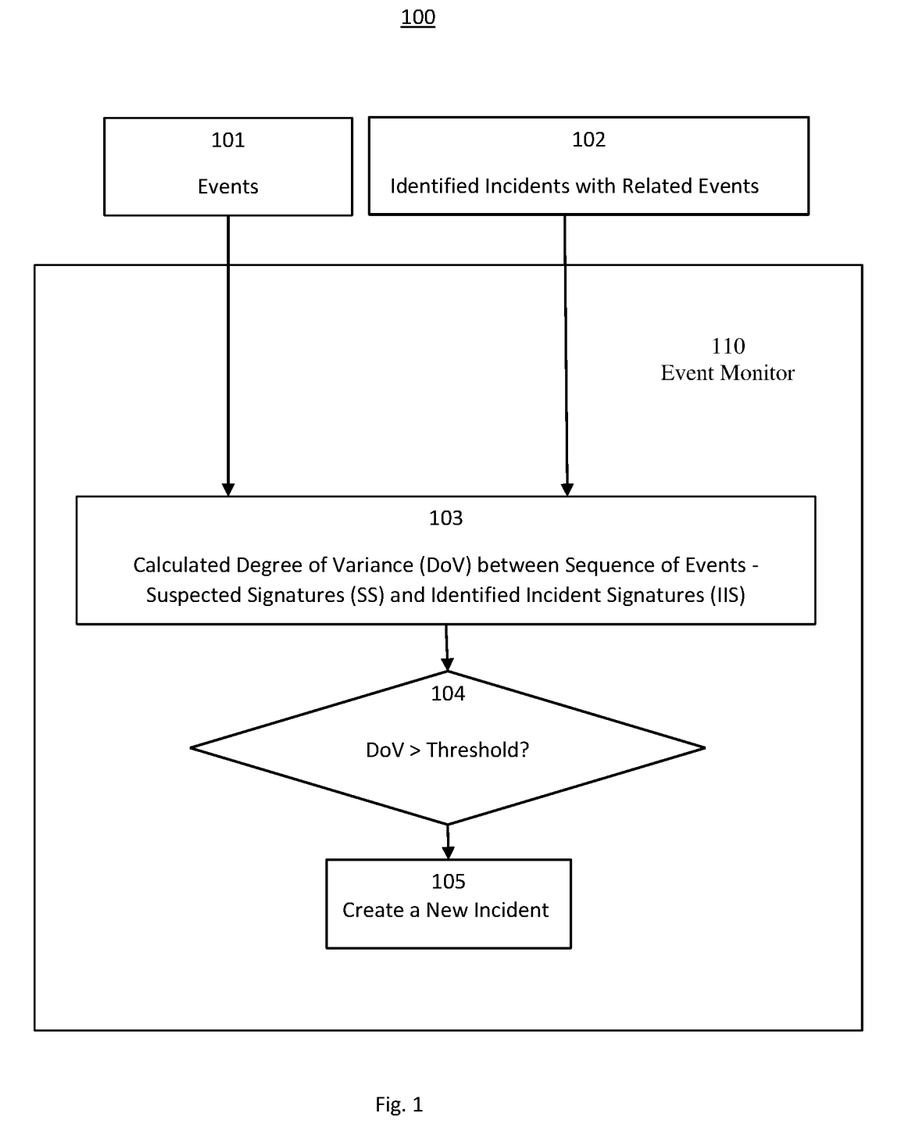
FIG. 1 shows an exemplary procedure for an operation of an Automatic Incident Generator according to an exemplary embodiment.

FIG. 1 shows an exemplary procedure for an operation of an AIG (100) according to an exemplary embodiment.

At some point, AIG (100) gets access to a stream of events (101) and a collection of previously identified incidents with related events (102).

Event monitor (110), in stage (103), calculates a degree of variance (DoV) between different sequences of events—suspected signatures (SS) and Identified Incident Signatures (IIS).

If DoV is less (or less or equal to) to threshold (104), a new incident is created (105).

Figure 2:
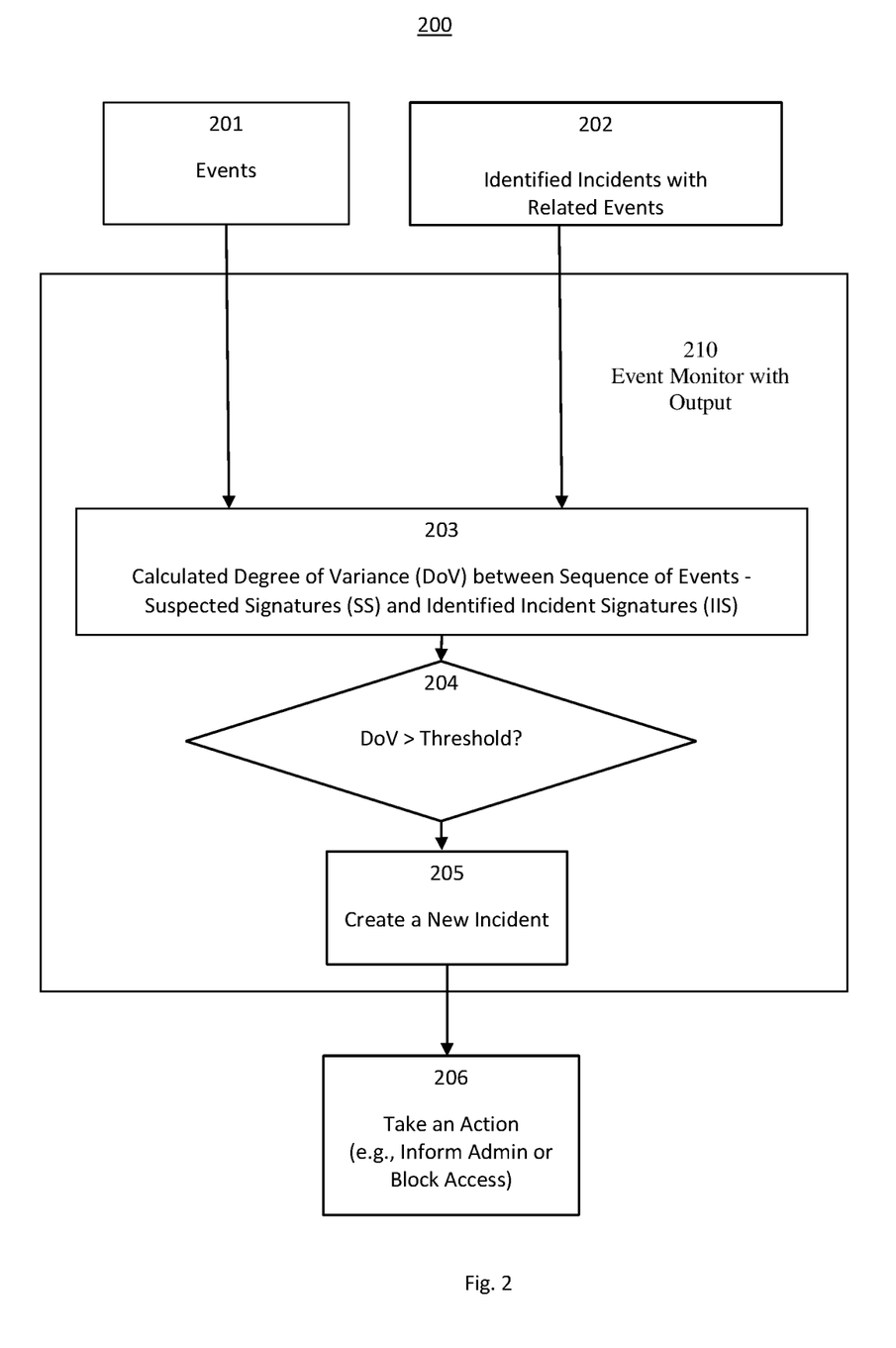
FIG. 2 shows an exemplary procedure for an operation of an embodiment of an Automatic Incident Generator that outputs certain information about an identified incident according to an exemplary embodiment.

FIG. 2 shows the operation of an embodiment of an AIG (200) that outputs certain information about the identified incident.

At some point, AIG (200) gets access to a stream of events (201) and a collection of previously identified incidents with related events (202).

Event monitor (210), in stage (203), calculates a degree of variance (DoV) between different sequences of events—suspected signatures (SS) and Identified Incident Signatures (IIS).

If DoV is less (or less or equals to) to the threshold (204), a new incident is created (205).

If an incident is created (205), it communicates information about that event to at least one system or at least one user or takes an action (206).

Figure 3:
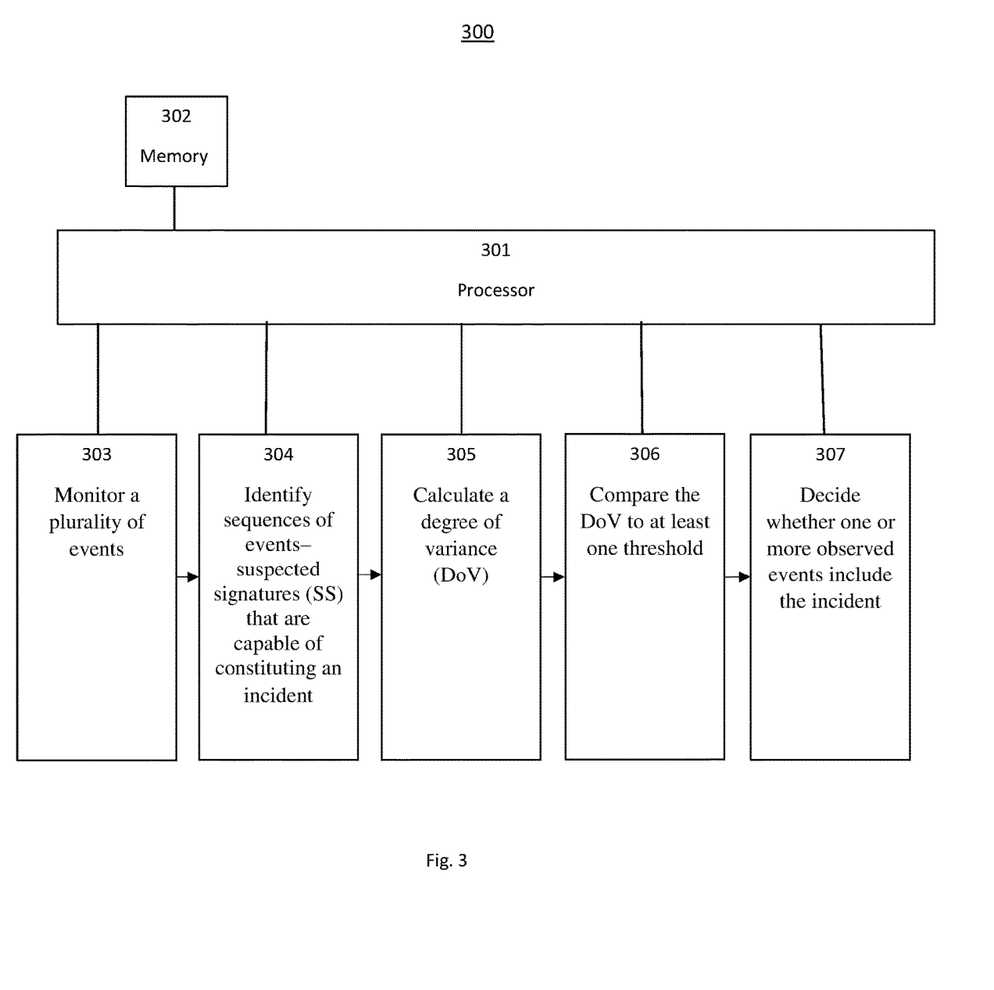
FIG. 3 shows the components and interactions of an exemplary system for an Automatic Incident Generator embodying the invention.

System (300) includes a processor (301) (e.g., Central Processing Unit (CPU)) of a computer coupled to a memory (302) that stores instructions that are implemented by the processor (301).

The processor (301) is configured to implement the instructions for system (300) for an automatic incident generator (AIG) with at least one type of events related to the system, and access to a repository of information about previously recorded incidents with the events related to the system, to monitor (303) a plurality of events, identify (304) sequences of events—suspected signatures (SS) that are capable of constituting an incident, calculate (305) a degree of variance (DoV) of the SS and at least one signature related to a previously recorded incident—investigated incident signature (IIS), compare (306) the DoV to at least one threshold and, if the DoV is less or equal to the threshold, identify the incident, and decide (307) whether one or more observed events include the incident.

In an exemplary embodiment, in system (300), the AIG raises the incident.

In an exemplary embodiment, in system (300), the AIG communicates certain information about the incident to a trouble tracking system or to a system administrator.

In an exemplary embodiment, in system (300), the AIG identifies controls related to the identified incident, and the AIG further applies controls related to the identified incident.

In an exemplary embodiment, in system (300), the AIG performs analysis using pre-programmed heuristic rules, statistical analysis, a neural network, or support vector machines.

In an exemplary embodiment, in system (300), the at least one signature includes information about a sequence of events.

Figure 4:
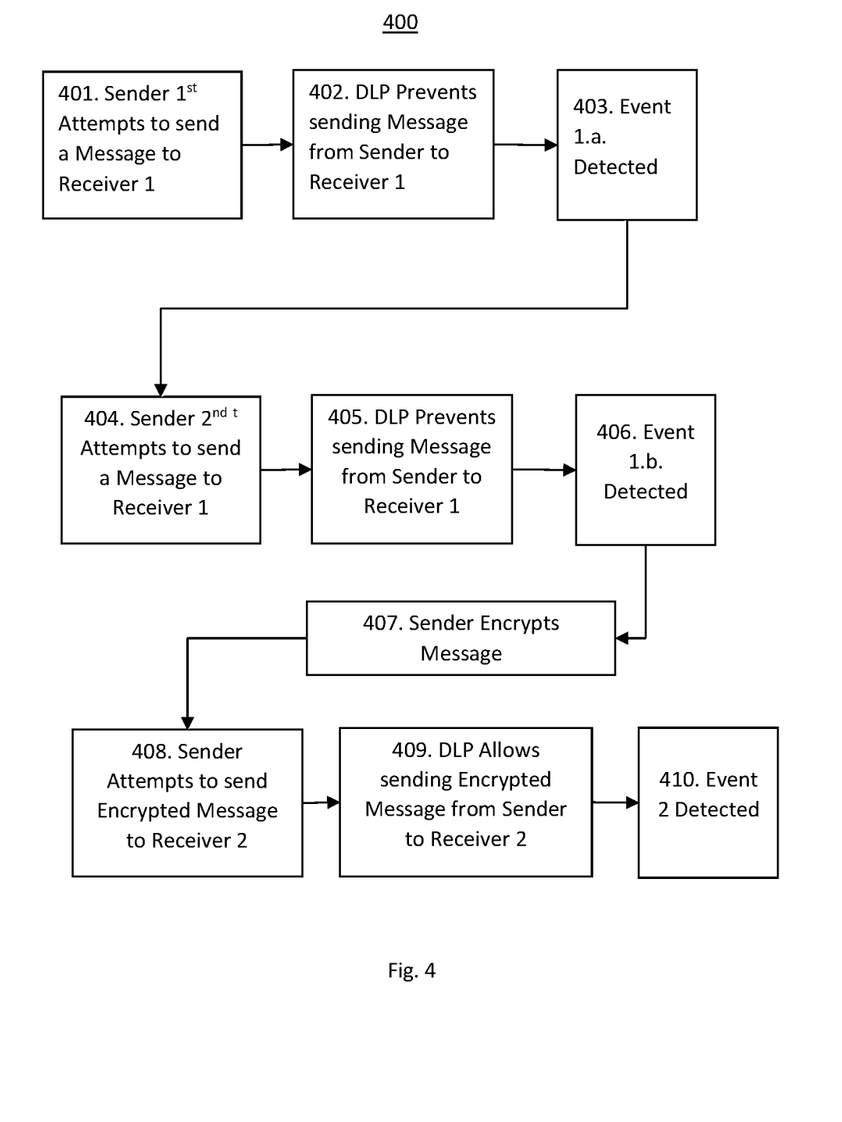
FIG. 4 shows exemplary detection of individual events that may indicate a potential data leakage incident.

FIG. 4 shows exemplary detection of individual events that may indicate a potential data leakage incident.

The process starts with the Sender attempting to send a Message to a Receiver for the first time (401). DLP prevents sending this message because it violates at least one security policy (402). The system detects event 1.a.: an attempt to send a message from Sender to a Receiver prevented by DLP No 1 (403).

Sender repeats the attempt to send a Message to a Receiver for the second time (404). DLP again prevents sending this message because it violates at least one security policy (405). The system detects event 1.b.: an attempt to send a message from Sender to a Receiver prevented by DLP No 2 (406).

Sender realizes that message cannot be sent as is and encrypts the message (or the attachment to the message) (407).

Sender attempts to send an encrypted message (or a message with an encrypted attachment) of a size similar to the size of the message that was attempted to be sent in the first two failed attempts (408).

DLP allows for the third, encrypted, message to be sent (409).

The system detects event (2)—sending of an encrypted message (or a message with an encrypted attachment) (410).

One of the previous investigations may have detected a similar situation in the past when a sequence of three events (1a, 1b, and 2) constituted a security incident—a successful data exfiltration.

In an embodiment, based on the previously classified message containing events 1a, 1b, and 2, the system and method analyzes the data flow before step 409 and classifies that sequence of events as a security incident. In an alternative embodiment, the system is further configured to take action based on the identification of the security incident. In this case, sending the encrypted message is prevented. In a further embodiment, the system alerts a security authority about a potential data exfiltration attempt by way of a message, which can be in the form of a GUI notification, an email, text message, or similar means.

Embodiments include an apparatus for performing the steps described in connection with above. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves.

Various special-purpose systems are used with programs and modules in accordance with the disclosed embodiments. The embodiments are not described with reference to any particular programming language. A variety of programming languages may be used to implement the teachings of the example implementations as described herein. The instructions of the programming languages may be executed by one or more processing devices, e.g., central processing units, processors, or controllers.

The operations described above are performed by a combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Moreover, the various functions described can be performed in a single unit or can be spread across several components in any number of ways. If desired, the instructions can be stored on the medium in a compressed or encrypted format.

The invention claimed is:

1. A method for automatic detection of security incidents in a computer system with access to a database of previously recorded security incidents comprising incident signatures based on a sequence of at least three events related to the security incidents, the method comprising:
    monitoring an event stream comprising a sequence of at least three system events in the computer system;
    calculating an incident signature based on the sequence of at least three system events;
    calculating a degree of variance (DoV) of the monitored sequence of events from the incident signature, wherein the DoV is the distance between the incident signature and an incident signature based on previously recorded security incidents;
    comparing the calculated DoV to a predetermined variance threshold;
    determining that the monitored sequence of events is a security incident associated with the incident signature of the previously recorded activities when the calculated DoV is less than or equal the threshold;
    determining that the monitored sequence of events is not a security incident associated with the incident signature of the previously recorded activities when the calculated DoV is greater than the threshold;
    executing instructions on the computer system based on the calculated DoV, wherein the instructions add the determined security incident to the database of previously recorded security incidents when the calculated DoV is less than or equal to the threshold and wherein the instructions do not add the monitored sequence of events to the database of previously recorded security incidents when the calculated DoV is greater than the threshold; and
    when the calculated DoV is less than or equal to the threshold,
    apply the security incident to a security policy which prevents sending a message to a receiver.

2. The method of claim 1, wherein the instructions further comprise raising the security incident by associating a security classification with a computer user associated with the security incident.

3. The method of claim 1, wherein the instructions further comprise communicating predetermined information about the security incident to a user of the computer system.

4. The method of claim 1, wherein the instructions further comprise communicating predetermined information about the security incident to a trouble tracking system.

5. The method of claim 1, wherein the instructions further comprise communicating predetermined information about the security incident to a system administrator.

6. The method of claim 1, wherein the instructions further comprise identifying controls in the computing system related to the security incident.

7. The system of claim 6, wherein the instructions further comprise applying controls in the computer system related to the security incident.

8. The method of claim 1, wherein a determined security incident is further analyzed and classified using pre-programmed heuristic rules, statistical analysis, a neural network, or support vector machines.

9. The method of claim 1, wherein the at least one incident signature comprises information about a sequence of four or more events.

10. The method of claim 1, wherein the security incident comprises a sequence of three or more events comprising failed attempts at transmitting digital data followed by a successful transmission of digital data to one or more receivers or one or more devices outside the computer system.

11. A system for automatic detection of security incidents in a computer system, the system comprising:
    a database of previously recorded security incidents comprising incident signatures based on a sequence of at least three events related to the security incidents;
    a microprocessor in communication with the database and coupled to a memory storing instructions, the microprocessor being configured to implement the instructions for automatic incident generation and access the database of previously recorded security incidents with the events related to these incidents, to:
    monitor an event stream comprising a sequence of at least three system events in the computer system;
    calculating an incident signature based on a sequence of the at least three system events;
    compare the calculated DoV to a predetermined variance threshold;
    calculate a degree of variance (DoV) of the monitored sequence of events from the incident signature wherein the DoV is the distance between the incident signature and an incident signature based on previously recorded security incidents;
    determine that the monitored sequence of events is a security incident associated with the incident signature of the previously recorded activities when the calculated DoV is less than or equal the threshold;
    determine that the monitored sequence of events is not a security incident associated with the incident signature of the previously recorded activities when the calculated DoV is greater than the threshold;
    execute instructions on the computer system based on the calculated DoV, wherein the instructions add the identified security incident to the database of previously recorded security incidents when the calculated DoV is less than or equal to the threshold and wherein the instructions do not add the monitored sequence of events to the database of previously recorded security incidents when the calculated DoV is greater than the threshold; and when the calculated DoV is less than or equal to the threshold, apply the security incident to a security policy which prevents sending a message to a receiver.

12. The system of claim 11, wherein the AIG instructions raise the security incident by associating a security classification with a computer user associated with the security incident.

13. The system of claim 11, wherein the instructions cause communication of predetermined information about the security incident to a user of the computer system.

14. The system of claim 11, wherein the instructions cause communication of predetermined information about the security incident to an incident management, trouble tracking, or workflow management system.

15. The system of claim 11, wherein the instructions cause communication of predetermined information about the security incident to a system administrator.

16. The system of claim 11, wherein the instructions cause identification of controls related to the security incident.

17. The system of claim 16, wherein the instructions apply controls in the computer system related to the security incident.

18. The system of claim 11, wherein the microprocessor is further configured to analyze and classify a determined security incident by performing analysis using pre-programmed heuristic rules, statistical analysis, a neural network, or support vector machines.

19. The system of claim 11, wherein the at least one incident signature comprises information about a sequence of four or more events.

20. The system of claim 11, wherein the security incident comprises a sequence of three or more events comprising failed attempts to transmit digital data followed by a successful transmission of digital data to one or more receivers or one or more devices outside the computer system.

* * * * *